(12) United States Patent
Yamane et al.

(10) Patent No.: US 6,408,139 B1
(45) Date of Patent: Jun. 18, 2002

(54) ZOOM FINDER

(75) Inventors: Kenji Yamane; Kazuhiko Onda, both of Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/705,892

(22) Filed: Nov. 6, 2000

(30) Foreign Application Priority Data

Nov. 4, 1999 (JP) ............................................ 11-313315

(51) Int. Cl.$^7$ ................................................ G03B 1/00
(52) U.S. Cl. ...................................................... 396/379
(58) Field of Search ............................. 396/72, 84, 85, 396/373, 379

(56) References Cited

U.S. PATENT DOCUMENTS

| | | | |
|---|---|---|---|
| 4,936,664 A | 6/1990 | Haraguchi et al. | 350/429 |
| 5,570,149 A | 10/1996 | Wakabayashi et al. | 396/85 |
| 5,708,886 A | * 1/1998 | Hayashi | 396/379 |
| 6,185,375 B1 | * 2/2001 | Mikami | 396/84 |

* cited by examiner

Primary Examiner—Christopher Mahoney

(74) Attorney, Agent, or Firm—Young & Thompson

(57) ABSTRACT

The invention is to provide a zoom finder which serves to make the size of camera compact and to reduce the mechanical loss in shifting the lenses to vary magnification of field view of the finder. A zoom finder of the invention including an intermediate lens barrel movable from a retracted position to a variable magnification section, capable of varying magnification of field of view by shifting a first lens and a second lens in association with the movement of the intermediate lens barrel, comprises a moving member guided by a guiding means disposed along an optical axis of the finder optical system and interlocked with the intermediate lens barrel, a first lever pivotally mounted on the moving member; a first cam engaging the first lever to rotate it in association with movement of the moving member; a first supporting member for supporting the first lens engaging a slot formed in the first lever; a second lever engaged with the moving member rotatable in association with the movement of the moving member; and a second lens supporting member engaging a cam slot formed in the second lever; wherein the first lens is shifted by both the rotation and the movement of the first lever and simultaneously the second lens is shifted by the rotation of the second lever, which are caused in association with the movement of the moving member, and the interlocking mechanism is disabled with its interlocking function when the intermediate lens barrel moves into the retracted position from the variable magnification section.

9 Claims, 4 Drawing Sheets

ZOOM FINDER

FIELD OF THE INVENTION

The invention relates to a zoom finder for varying magnification of the field view in association with an operation of varying magnification in a photographing lens system

BACKGROUND OF THE INVENTION

Zoom finders for varying magnification of the field view in association with an operation of varying magnification in a zooming lens system are disclosed in Japanese Laid-open Patent 264034/87 (tokkai-sho 62-264034) or Japanese Laid-open Patent 159826/95 (tokkai-hei 07-159826). In Japanese Laid-open Patent 264034/87 (tokkai-sho 62-264034), a rotational movement of the photographic zooming lens barrel is transformed into a linear movement of the cam plate the direction of which is perpendicular to the optical axis of the photographic lens, i.e., in the film feeding direction, by using gear train and rack-and-pinion mechanism. The lenses of the finder optical system are moved by using the linear movement of the cam plate.

In Japanese Laid-open Patent 159826/95 (tokkai-hei07-159826), a rotational movement of the photographic zooming lens barrel is transformed into a rotational movement in horizontal plane of the cam plate by using gear train, which is adapted to move the lenses of the finder along the optical axis.

However, using gear train requires a large space in the camera and the cam plate movable in the film feeding direction requires more space to allow its movement, which cause the size of camera to increase. Furthermore, the directions between the movement of the cam plate and the one of lenses of the finder are different, which causes fair mechanical loss and requires more powerful motor and/or leads to much consumption of a battery to drive the motor.

SUMMARY OF THE INVENTION

The present invention is to provide a zoom finder which serves to make the size of camera compact and to reduce the mechanical loss in shifting the lenses to vary magnification of field view of the finder.

A zoom finder of the invention for varying magnification of field of view by shifting positions of a first lens and a second lens in a finder optical system comprises a moving member movable along an optical axis of the finder optical system in association with an operation of varying magnification in a photographing optical system; a first lever pivotally mounted on the moving member;

a first cam engaging the first lever to rotate it in association with movement of the moving member; a first supporting member for supporting the first lens movable along the optical axis of the finder optical system with engaging a slot formed in the first lever; a second lever of which one end portion is engaged with the moving member rotatable about the other end portion in association with the movement of the moving member; and a second supporting member for supporting the second lens movable along the optical axis of the finder optical system with engaging a cam slot formed in the second lever; wherein the first lens is shifted by the rotation and the movement along the optical axis of the finder optical system of the first lever and simultaneously the second lens is shifted by the rotation of the second lever, which are caused in association with the movement of the moving member.

A zoom finder of the invention, installed in a camera including a variable magnification lens barrel movable from a retracted position where the lens barrel is fully retracted inside body of the camera to a variable magnification section where a photographing optical system is adapted to have a variable magnification by moving the lens barrel back and forth, capable of varying magnification of field of view by shifting a first lens and a second lens in a finder optical system in association with movement of the variable magnification lens barrel, comprises a moving member guided to move by a guiding means disposed along an optical axis of the finder optical system and interlocked with the variable magnification lens barrel via an interlocking mechanism so as to be able to automatically move in association with movement of the variable magnification lens barrel in the variable magnification section; a first lever pivotally mounted on the moving member; a first cam engaging the first lever to rotate it in association with movement of the moving member; a first supporting member for supporting the first lens movable along the optical axis of the finder optical system with engaging a slot formed in the first lever; a second lever of which one end portion is engaged with the moving member rotatable about the other end portion in association with the movement of the moving member; and a second supporting member for supporting the second lens movable along the optical axis of the finder optical system with engaging a cam slot formed in the second lever; wherein the first lens is shifted by both the rotation and the movement of the first lever and simultaneously the second lens is shifted by the rotation of the second lever, which are caused in association with the movement of the moving member, and the interlocking mechanism is disabled with its interlocking function when the variable magnification lens barrel moves into the retracted position from the variable magnification section.

As the guiding means of the zoom finder of the invention, a guiding slot can be applied, the length of which is limited to the one corresponding to a length of region where the lens barrel can be moved to vary magnification.

As a part of the interlocking mechanism of the invention, a resilient member is used, which can disable the interlocking function of the interlocking mechanism by absorbing a shift of the lens barrel when the lens barrel moves into the retracted position from the variable magnification section.

DETAILED DESCRIPTION OF THE INVENTION

Figure 1A:
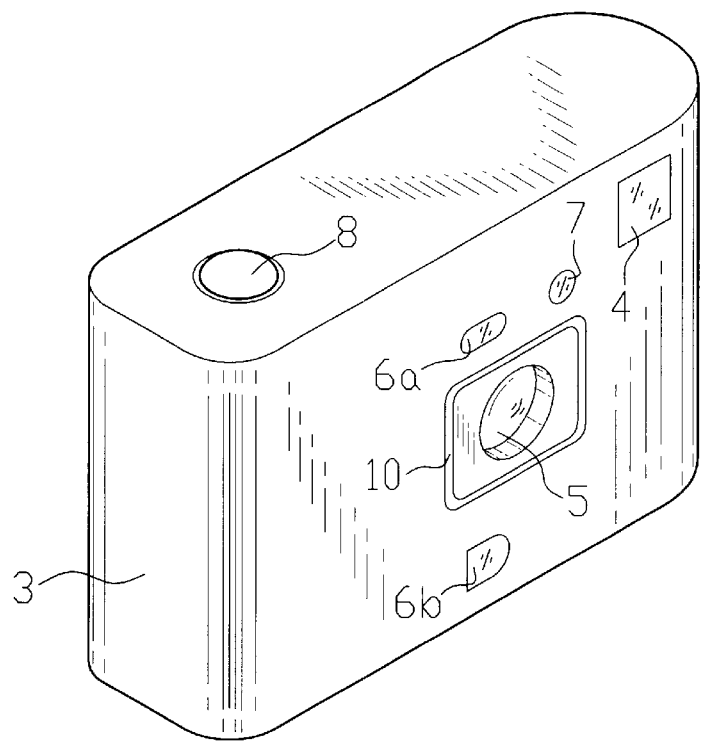
FIG. 1A shows a perspective view of a camera in which a variable magnification lens barrel is located at a retracted position.
Figure 1B:
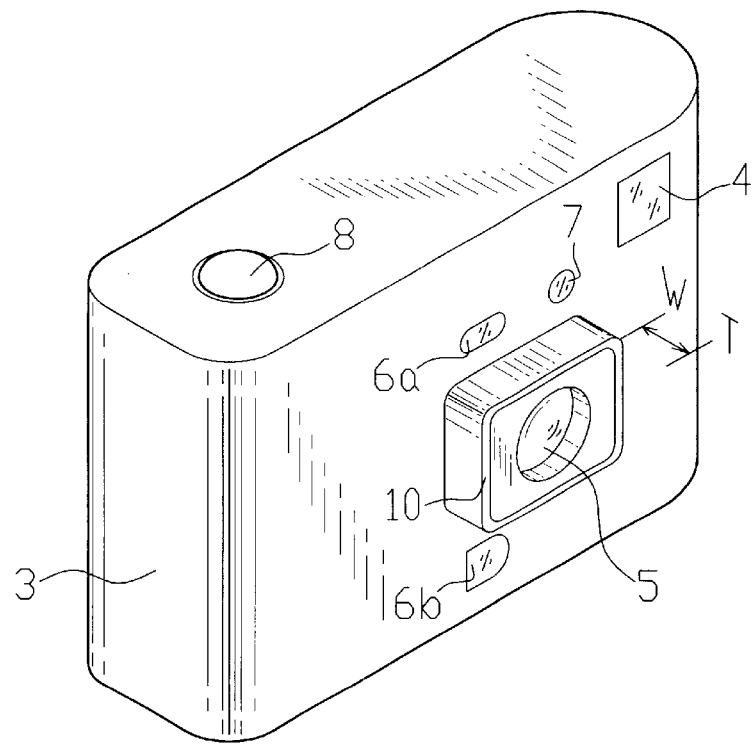
FIG. 1B shows a perspective view of a camera in which a variable magnification lens barrel is located in a variable magnification section.

As shown in FIG.1A and FIG.1B, on a front side of a camera body 3 is disposed a variable magnification lens barrel 10 in which a photographic optical system 5 is contained. When a power switch of the camera (not shown)

turned on, a zooming motor (not shown) rotates forward, so the variable magnification lens barrel 10 moves forward to a wide-angle position W shown in FIG. 1B from a retracted position shown in FIG.1A. On the rear side of the camera body 3, a zooming switch (not shown) is disposed, which is capable of being operated bi-directionally. The zooming motor rotates in both direction by operating the zooming switch. When the zooming motor rotates forward, the variable magnification lens barrel 10 moves forth, toward the telephoto position T from the wide-angle position W. On the other hand, when the zooming motor rotates backward, the variable magnification lens barrel 10 moves back, toward the wide-angle position W. When the power switch turned off, the zooming motor rotates backward, so the variable magnification lens barrel 10 moves back beyond the wide-angle position W, to the retracted position where the variable magnification lens barrel 10 is inside the camera body 3.

In using the camera, the variable magnification lens barrel 10 moves in a variable magnification section where is between the wide-angle position W and the telephoto position T. As known well, a couple of lenses (not shown) which comprise the photographing optical system 5 move inside the variable magnification lens barrel 10, so the focal length of the photographic optical system 5 changes. Thereby, the magnification of the photographic optical system 5 changes according to the position of the variable magnification lens barrel 10.

A finder window is formed on the left upper section of the camera body 3. A finder optical system is provided in the finder window 4. The magnification of field of view changes according to the focal length of the photographic optical system 5. A light protecting window 6a and a light receiving window 6b for auto-focusing are provided above and below the variable magnification lens barrel 10 respectively. The reference numerals 7 and 8 are a photometric window and a shutter button respectively.

Figure 2:
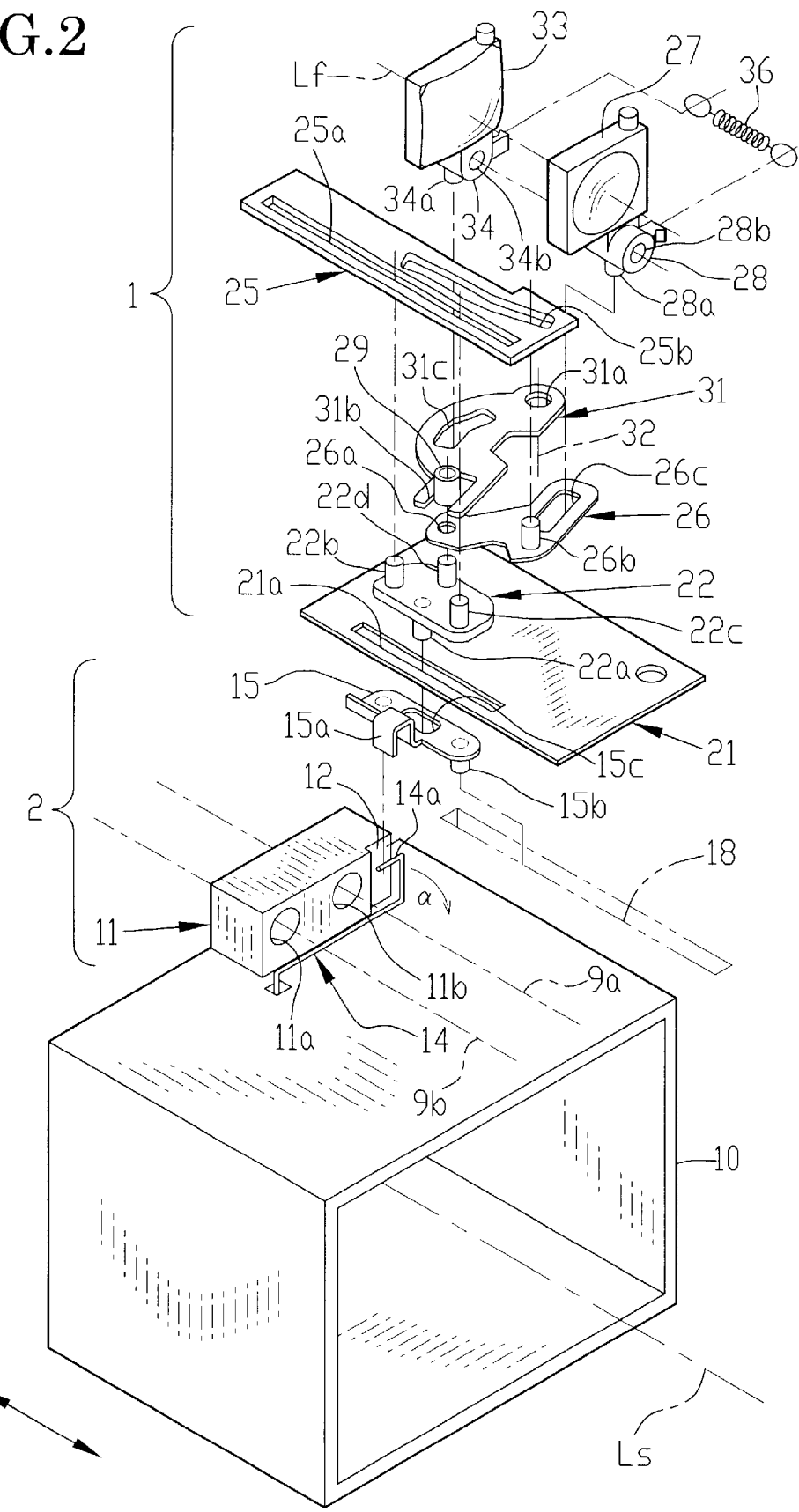
FIG. 2 shows an exploded perspective view of a main portion of zoom finder of the present invention.

FIG. 2 shows a main portion of the zoom finder of this invention, where a photographic zooming lens system is disposed below the zoom finder 1. The photographic zooming lens system includes a variable magnification lens barrel 10 which is capable of varying magnification of the photographic zooming lens by moving along the optical axis Ls of the photographic zooming lens and capable of varying magnification of field view of the zoom finder by transmitting the movement of the variable magnification lens barrel along the optical axis Ls to a shifting lens mechanism of the finder via an interlocking mechanism 2.

The variable magnification lens barrel 10 is extended together with the photographic zooming lens system from inside the camera body when a power switch of the camera turned on and retracted back inside when turned off.

Upper portion of the varying magnification lens barrel, a projected portion 11 is integrally formed which has a pair of through-holes 11a, 11b into which a pair of guiding shafts 9a, 9b briefly shown by a dash-single line) are slidably inserted. A torsion bar 14 as a resilient member is fixed adjacently to the projected portion. One end of the torsion bar 14 is secured to the upper portion and the other end is folded to make L-shape.

Figure 4:
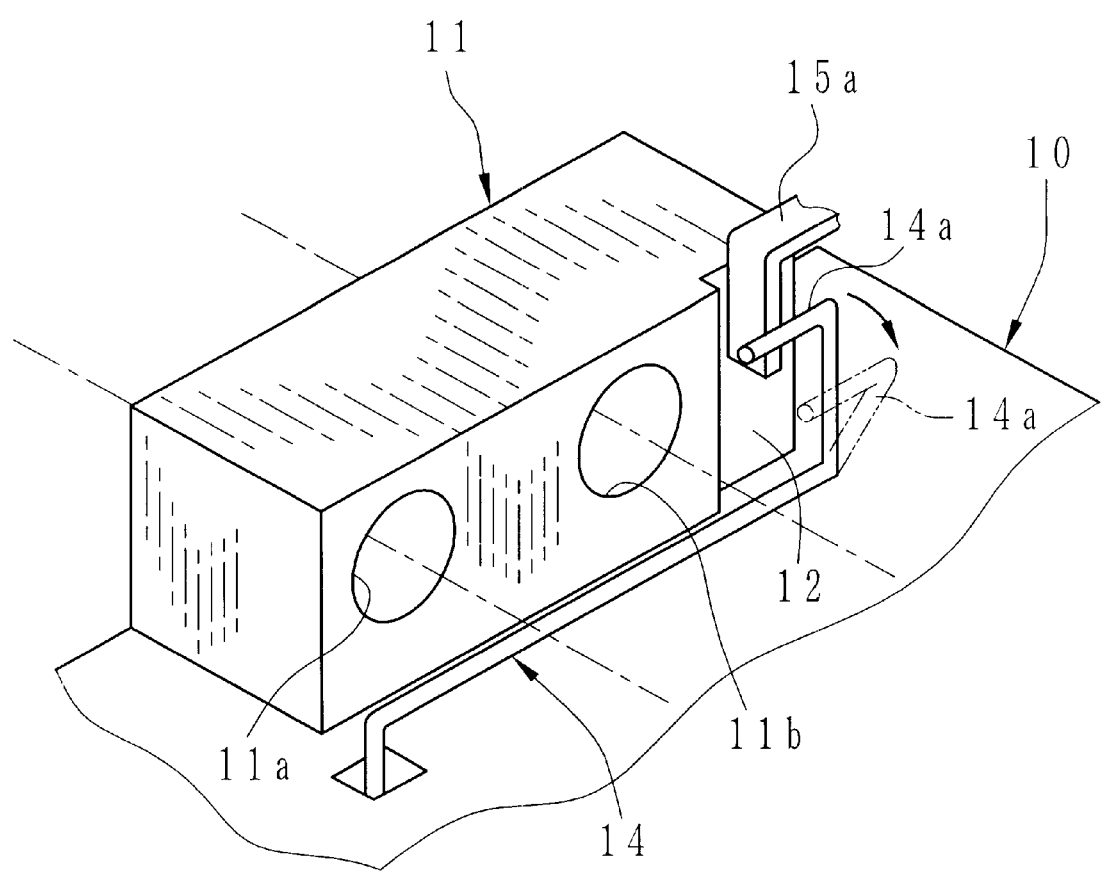
FIG. 4 shows a detail of FIG. 3 including a deflected position of a torsion bar.

A lens barrel side slider 15 has middle area bent out of its plane to form a U-shaped arm 15a. One end portion of the U-shaped arm 15a gets caught between the torsion bar 14 and a recess 12 formed in the projected portion 11 while the varying magnification lens barrel 10 locates in a variable magnification section of the zooming lens system so that the lens barrel side slider 15 can exactly move with the variable magnification lens barrel. The torsion bar 14 is elastically deformed in the direction indicated by the arrow "α" as illustrated in detail in FIG.4 when the lens barrel 10 moves back into the retracted position beyond a wide angle end in the variable magnification section so that the lens barrel 10 can move back independently of a stop of the lens barrel side slider 15.

As the torsion bar 14 still keeps on engaging the one end portion of the U-shaped arm 15a being elastically deformed, the one end portion gets caught again between the torsion bar 14 and a recess 12 when the lens barrel 10 returns to the variable magnification section.

A pair of projections 15b formed on the bottom surface of the lens barrel side slider 15 are received as a free fit in a lens barrel side guiding slot 18 formed along the optical axis Ls of the photographic zooming lens. The lens barrel side guiding slot 18 has a limited length corresponding to a length of region where the zoom finder 1 can be adjusted to vary its magnification, by which limited is an amount of movement of the lens barrel side slider The lens barrel side slider 15 has an aperture 15c in the middle portion, in which received is a pin 22a of the finder side slider 22 for variable magnification of field view of the finder. The aperture 15c is approximately rectangular-shaped, slightly longer in the direction along the optical axis Ls so that the finder optical system will not be affected when the lens barrel 10 is slightly moved to make focussing.

A base plate 21 for bearing a finder driving components is disposed above the lens barrel side slider 15. A finder side guiding slot 21 is formed in the base plate 21. Above the base plate 21 is disposed a finder side slider 22 of which bottom side has a pin 22a inserted into the finder-side guiding slot 21a and received in the aperture 15c of the lens barrel side slider 15 located below the base plate. Thus the projected portion 11, the torsion bar 14 and the lens-barrel-side slider 15 make an interlocking mechanism which transmits the movement of the lens barrel 10 to the finder-side slider 22 to move the optical system of the zoom finder in association with the movement of the lens barrel 10.

The finder-side slider 22 has three pins 22b, 22c and 22d on its top side implanted therein. Two pins 22b and 22c, which are in parallel relation to the optical axis Ls of the photographic optical system, are received in the finder-side guiding slot 25a formed in a finder cam 25 fixed above the finder-side slider 22. Thus the finder-side slider 22 can slide back and forth along the finder-side guiding slot 25a.

The pin 22d is received in a hole 26a formed in a roughly L-shaped front lens group moving lever 26 which is disposed above the finder-side slider 22 and capped with a pipe 29 not to come out. The front lens group moving lever 26 has a pin 26b on its top side implanted therein and the pin 26b is received in a stroke-adjusting cam slot 25b. The front lens group moving lever 26 also has a slot 26c in which a pin 28a is received which formed on the supporting member 28 to support a front concave lens group 27.

A rear lens group moving lever 31 is disposed between the finder cam 25 and the front lens group moving lever 26. The rear lens group moving lever 31 is pivotally mounted to a fixed shaft 32 (see FIG.3B) on a finder frame via hole 31a formed in one end portion of the lever 31.The other end portion of the lever 31 is forked to receive the pipe 29 in a fit in its open-ended slot 31b so that the linear movement of the finder-side slider 22 is transformed into the rotational movement of the rear lens group moving lever 31. A pin 34a, formed on a supporting member 34 supporting the rear convex lens group 33, is received in a stroke-adjusting cam slot 31c which is formed in the middle portion of the rear lens group moving lever 31.

A hole 28b and a hole 34b are formed in the supporting members 28 supporting the front lens group 27 and the supporting members 34 supporting the rear lens group 33 respectively. A finder guiding shaft (not shown) set along the finder optical axis Lf is received in those two holes 28b and 34b. The supporting members 28 and 34 are spring-biased toward each other by a spring 36 hooked between the two supporting members so that the front lens group 27 and the rear lens group 33 are pulled by each other, which leads to more accurate positioning of those lenses.

The zoom finder 1 has other optical components than the front group 27 and the rear group 33 for varying magnification. An concave object lens 38 is fixed in front of the front lens group 27 and a reversing right-to-left image prism 39, a target lens 40, a reversing top-to-bottom image prism 41 and an eye piece lens 42 are fixed behind the rear lens group 33.

Figure 3:
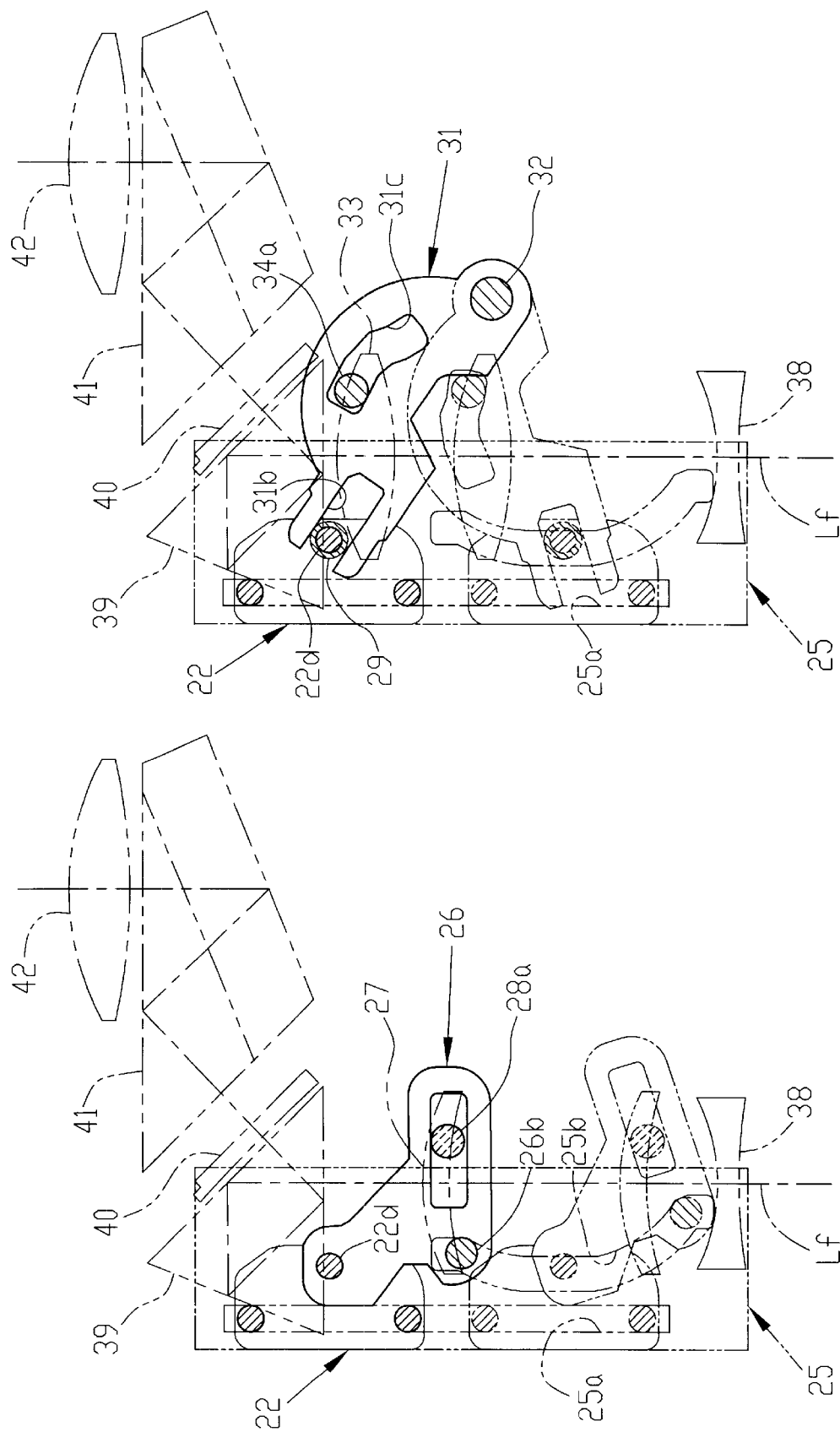
FIG. 3A shows an explanatory diagram of a movement of a front lens group.
FIG. 3B shows an explanatory diagram of a movement of a rear lens group.

As shown in FIG.3A illustrating a movement of the front lens group 27, the finder-side slider 22 is positioned in backmost position close to the eye piece 42(drawn by a solid line) when the photographic zoom lens system is set in a wide-angle limit. At this moment the pin 26b of the front lens group moving lever 26 is positioned backmost in the stroke-adjusting cam slot 25b.

When the variable magnification lens barrel is moved forwardly extending from wide-angle limit position to telephoto limit position to vary magnification, the lens barrel side slider 15 is moved along the lens barrel side guiding slot 18, which makes the finder side slider 22 shifted toward the object lens 38. Consequently the front lens group moving lever 26 is rotated around the pin 22d with moving along the stroke-adjusting cam slot 25b toward the object lens 38. Thus the amount of the movement of the front lens group 27 in the direction parallel to the finder optical axis is reduced according to the amount of rotation of the lever 26, which adjusts the stroke of the front lens group 27 to correspond to the magnification of the photographic zooming lens system.

As shown in FIG.3B illustrating a movement of the rear lens group 33, when the finder-side slider 22 is positioned in backmost position close to the eye piece 42(drawn by a solid line), the fork portion of the rear lens group moving lever 31 is rotated close to the reversing right-to-left image prism 39. As the zooming lens system is shifted from wide-angle limit position toward telephoto limit position, the finder-side slider 22 moves toward the object lens 38 and the rear lens group moving lever 31 is rotated counterclockwise about the fixed shaft 32. This motion carries the pin 34a toward the object lens 38 with adjusting the stroke or carried distance of the pin 34a according to the shape of the stroke adjusting cam slot 31c. Thus the stroke of the rear lens group 33 is adjusted. In the case where the zooming lens system is shifted from telephoto limit position toward wide-angle limit position, every components work reversibly.

As explained above, the finder-side slider 22 is moved in the same direction as the variable magnification lens barrel 10 moves, and the movement and rotation of the front lens group moving lever 26 and the rotation of the rear lens group moving lever 31 are made in the same direction as the finder-side slider 22 is moved. Therefore, the mechanical power to move the variable magnification lens barrel 10 is efficiently used to move the front and rear lens groups 27, 32 smoothly with less power-loss. This smooth and less power-loss transmittance of force help to make more precice positioning of the finder lenses and save consumption of battery or make it possible to use a small size motor.

The variable magnification lens barrel 10 has to be slightly moved to make the zoom lens system focus on the subject, which causes slight movement of the lens barrel side slider 15. However the shape of the aperture 15c of the finder side slider 22, which is slightly longer in the moving direction of the slider 22, allows the lens barrel side slider 15 to move without moving the finder side slider 22. In other words, the zoom finder is not affected by the focusing movement of the photographic zooming lens system.

When the power switch of the camera is turned off, the variable magnification lens barrel is moved back through the wide-angle limit position into the retracted position together with the zooming lens system. At the wide-angle limit position, the lens barrel side slider 15 is stopped because the lens barrel side guiding slot 18 has a limited length corresponding to a length of region where the zoom finder 1 can be adjusted to vary its magnification, by which limited is an amount of movement of the lens barrel side slider 15. More precisely, one of the pair of projections 15b formed on the lens barrel side slider 15 hits the end wall of the guiding slot 18. However, the lens barrel 10 can move back independently of a stop of the lens barrel side slider 15 because the lens barrel 10 moves back into the retracted position beyond a wide-angle limit in the variable magnification section, the torsion bar 14 is elastically deformed by pressing by the end of U-shaped arm 15a.

Under the condition that the zooming lens is in the retracted position, the lens barrel side slider 15 is urged against the wall of the lens barrel side guiding slot 18 by the torsion bar 14, which causes the finder side slider 22 is secured at wide-angle limit position. Accordingly the front lens group 27 and the rear lens group 33 are firmly fixed. It is also possible to save the space for a mechanism to move the zoom finder system beyond wide-angle limit position which is primarily unnecessary.

Parts required for varying magnification of the finder optical system of the invention are almost only the finder side slider 22, two small levers 26, 33 and the finder cam 25. Moving range of the finder side slider 22 and the lever 26, 33 is fairly limited one along the finder optical axis Lf. Those features are very advantageous to making a more compact size camera.

It is clear that the zoom finder of the invention can be applied not only to the compact lens shutter camera but also other type of camera such as instant camera, digital camera and video camera.

What is claimed is:

1. A zoom finder for varying magnification of field of view by shifting positions of a first lens and a second lens in a finder optical system comprising:

a moving member movable along an optical axis of the finder optical system in association with an operation of varying magnification in a photographing optical system;

a first lever pivotally mounted on the moving member;

a first cam engaging the first lever to rotate it in association with movement of the moving member;

a first supporting member for supporting the first lens movable along the optical axis of the finder optical system with engaging a slot formed in the first lever;

a second lever of which one end portion is engaged with the moving member rotatable about the other end portion in association with the movement of the moving member; and a second supporting member for supporting the second lens movable along the optical axis of the finder optical system with engaging a cam slot formed in the second lever;

wherein the first lens is shifted by the rotation and the movement along the optical axis of the finder optical system of the first lever and simultaneously the second lens is shifted by the rotation of the second lever, which are caused in association with the movement of the moving member.

2. A zoom finder installed in a camera including a variable magnification lens barrel movable from a retracted position where the lens barrel is fully retracted inside a body of the camera to a variable magnification section where a photographing optical system is adapted to have a variable magnification by moving the lens barrel back and forth, capable of varying magnification of field of view by shifting a first lens and a second lens in a finder optical system in association with movement of the variable magnification lens barrel, comprising:

a moving member guided to move by a guiding means disposed along an optical axis of the finder optical system and interlocked with the lens barrel via an interlocking mechanism so as to be able to automatically move in association with movement of the lens barrel in the variable magnification section;

a first lever pivotally mounted on the moving member;

a first cam engaging the first lever to rotate it in association with movement of the moving member;

a first supporting member for supporting the first lens movable along the optical axis of the finder optical system with engaging a slot formed in the first lever;

a second lever one end portion of which is engaged with the moving member rotatable about the other end portion in association with the movement of the moving member; and a second supporting member for supporting the second lens movable along the optical axis of the finder optical system with engaging a cam slot formed in the second lever;

wherein the first lens is shifted by both the rotation and the movement of the first lever and simultaneously the second lens is shifted by the rotation of the second lever, which are caused in association with the movement of the moving member, and the interlocking mechanism is disabled with its interlocking function when the variable magnification lens barrel moves into the retracted position from the variable magnification section.

3. The zoom finder as defined in claim 2, wherein the guiding means is a guiding slot the length of which is limited to the one corresponding to a length of region where the variable magnification lens barrel can be moved to vary magnification.

4. The zoom finder as defined in claim 3, wherein the interlocking mechanism includes a resilient member which disables the interlocking function of the interlocking mechanism by absorbing a shift of the variable magnification lens barrel when the variable magnification lens barrel moves into the retracted position from the variable magnification section.

5. The zoom finder as defined in claim 2, wherein interlocking mechanism includes a resilient member which disables the interlocking function of the interlocking mechanism by absorbing a shift of the variable magnification lens barrel when the variable magnification lens barrel moves into the retracted position from the variable magnification section.

6. A zoom finder installed in a camera including a variable magnification lens barrel movable from a retracted position where the lens barrel is fully retracted inside a body of the camera to a variable magnification section where a photographing optical system is adapted to have a variable magnification by moving the lens barrel along an optical axis of the photographing optical system, capable of varying magnification of field of view by shifting lenses in a finder optical system along an optical axis of the finder, comprising:

an interlocking mechanism for varying the magnification of the field of view, by interlocking with the variable magnification lens barrel corresponding to the magnification of the photographing optical system; and a coupling member for coupling the variable magnification lens barrel and the interlocking mechanism, the coupling member has an elasticity and prevents from transmitting the movement of the variable magnification lens barrel to the interlocking mechanism by absorbing a shift of the variable magnification lens barrel, when the variable magnification lens barrel moves into the retracted position from the variable magnification section.

7. The zoom finder as defined in claim 6, wherein the interlocking mechanism comprises a moving member movable along the optical axis of the photographing optical system, the moving member is pressed against the variable magnification lens barrel by the coupling member.

8. The zoom finder as defined in claim 7, wherein the coupling member is a torsion bar having a first distal end and a second distal end, the first distal end is secured to the variable magnification lens barrel and the second distal end presses the moving member against a front side of a portion of the variable magnification lens barrel.

9. The zoom finder as defined in claim 8, wherein the finder optical system comprises at least one movable lens that moves along the optical axis of the finder, the interlocking mechanism comprises a cam mechanism that is operated by the moving member to move the movable lens.

* * * * *